United States Patent [19]

Sprenger et al.

[11] Patent Number: 4,660,787
[45] Date of Patent: Apr. 28, 1987

[54] FOOD SUPPLY SYSTEM FOR AN AIRCRAFT

[75] Inventors: Wilfried Sprenger, Issendorf; Safa Kirma, Hamburg-Wedel, both of Fed. Rep. of Germany

[73] Assignee: Messerschmitt-Boelkow-Blohm Gesellschaft mit Beschraenkter Haftung, Munich, Fed. Rep. of Germany

[21] Appl. No.: 885,380

[22] Filed: Jul. 14, 1986

Related U.S. Application Data

[60] Division of Ser. No. 803,501, Nov. 27, 1985, abandoned, which is a continuation of Ser. No. 555,685, Nov. 28, 1983, abandoned.

[30] Foreign Application Priority Data

Dec. 11, 1982 [DE] Fed. Rep. of Germany ....... 3245986

[51] Int. Cl.$^4$ .............................................. B64D 11/04
[52] U.S. Cl. ................................... 244/118.5; 186/40; 186/47
[58] Field of Search ........... 244/118.5; 186/40, 45-48, 186/50-51; 187/3-5; 105/327, 329, 340

[56] References Cited

U.S. PATENT DOCUMENTS 2,395,735  2/1946  Grigsby ................................. 186/51
3,517,899  6/1970  Vernon ............................. 244/118.5
4,022,404  5/1977  Greiss ............................. 244/118.5
4,055,317  10/1977  Greiss ............................. 244/118.5

OTHER PUBLICATIONS

Nordskog Co., Inc, Drawing No. 1328, "Food Service Proposal for Supersonic Aircraft", Jun. 7, 1960.

Primary Examiner—Trygve M. Blix
Assistant Examiner—Rodney Corl
Attorney, Agent, or Firm—W. G. Fasse; D. H. Kane, Jr.

[57] ABSTRACT

A food supply system is adapted for installation in an aircraft having an upper and a lower deck. A pantry is located on the upper deck. A food supply carts carrying platform is arranged on the lower deck for cooperation with the pantry on the upper deck. A lifting mechanism is arranged for cooperation with the platform for lifting or lowering selectively any one of a plurality of food supply carts whereby the space requirements on each deck are optimally reduced.

10 Claims, 12 Drawing Figures

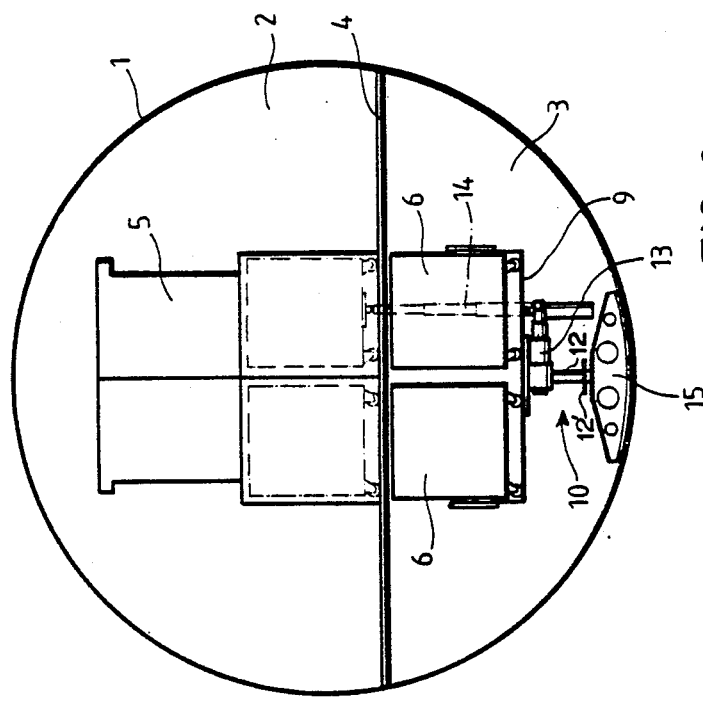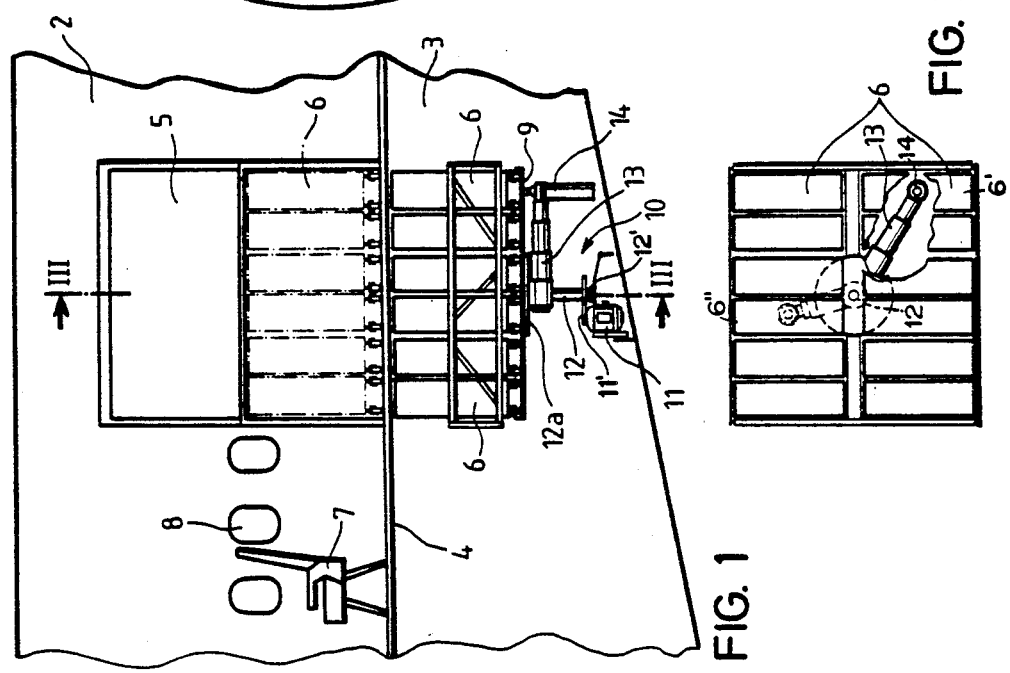

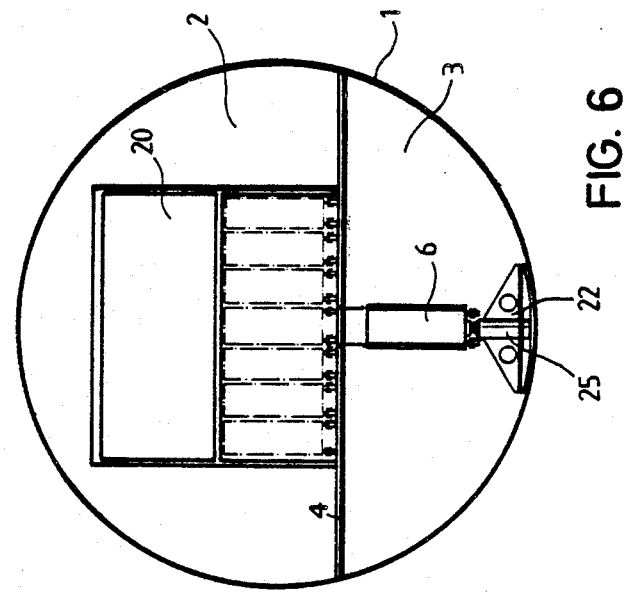
FIG. 6
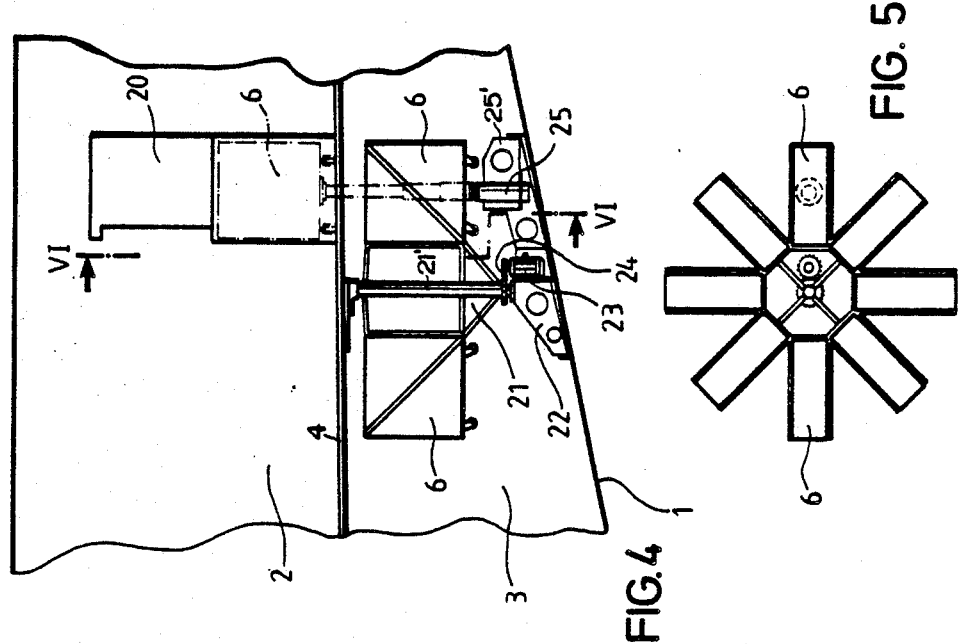
FIG. 4
FIG. 5

4,660,787

FOOD SUPPLY SYSTEM FOR AN AIRCRAFT

This application is a Division, of applicaton Ser. No.: 803,501, filed Nov. 27, 1985, which in turn is a CON/ U.S. Ser. No. 555,685, filed on Nov. 28, 1983, both now abandoned.

FIELD OF THE INVENTION

The invention relates to a food supply system for an aircraft having an upper deck and a lower deck with a pantry arranged on the upper deck, wherein food supply carts are movable between the pantry and the lower deck.

DESCRIPTION OF THE PRIOR ART

U.S. Pat. No. 3,517,899 discloses such a food supply system in which the entire kitchen facilities are arranged on the lower deck and the connection between the kitchen and the upper passenger deck is provided by two elevators or lifts arranged next to each other. In such a system a separate kitchen crew is required for the substantial kitchen facilities on the lower deck. Meeting such a requirement is not feasible, especially in multipurpose aircraft which transport passengers on the upper deck and freight on the lower deck, because the kitchen facility with its crew needs a substantial proportion of the space available on the lower deck. Additionally, space is required on the upper or passenger deck for two pantry dressers or buffets for quickly preparing drinks or the like.

OBJECTS OF THE INVENTION

In view of the above it is the aim of the invention to achieve the following objects singly or in combination:
to provide a food supply system for an aircraft with two decks which is so divided that the space requirements on both decks are minimized while simultaneously assuring an effective and rapid food supply service for the passengers;
to reduce the space requirements for the pantry on the upper deck by using storage facilities for food supply carts primarily on the lower deck; and
to automate the food supply system in such a way that crew members will be needed only in the pantry, but not in the storage facility below the pantry.

SUMMARY OF THE INVENTION

The food supply system according to the invention comprises a pantry on the upper deck and a cart carrying platform on the lower deck for cooperation with the pantry. The pantry can hold a number of food supply carts inserted into respective stalls in the pantry. The platform on the lower deck carries further food supply carts, and a power driven automatically operable lifting mechanism is arranged for cooperation with the platform for selectively lifting or lowering any one of the food supply carts from the platform to the pantry and vice versa.

The main advantages of the invention are seen in that the space requirement on both decks for the food supply system has been reduced substantially as compared to the prior art and that the number of crew members for operating the system has also been reduced because the control of the movement of the food supply carts is possible automatically from the pantry on the upper deck, thereby avoiding kitchen personnel on the lower deck. Moreover, the system as such is rather simple in its components and construction. For example, it is possible to continue to use conventional food supply carts also in the present system.

BRIEF FIGURE DESCRIPTION

In order that the invention may be clearly understood, it will now be described, by way of example, with reference to the accompanying drawings, wherein:

FIG. 1 illustrates a first embodiment of a food supply system according to the invention in which food supply carts are arranged on a platform on the lower deck;

FIG. 2 is a top plan view of the platform of FIG. 1 with carts thereon on the lower deck, whereby the carts form two groups with carts arranged alongside each other in each group and with one group arranged behind the other group;

FIG. 3 is a sectional view along section line III—III in FIG. 1;

FIG. 4 illustrates a side view similar to that of FIG. 1, but showing a second embodiment of a system according to the invention;

FIG. 5 is a top plan view of the platform according to FIG. 4 with the carts arranged in a radially extending, star-shaped orientation;

FIG. 6 is a sectional view along section line VI—VI in FIG. 4;

Figure 9:
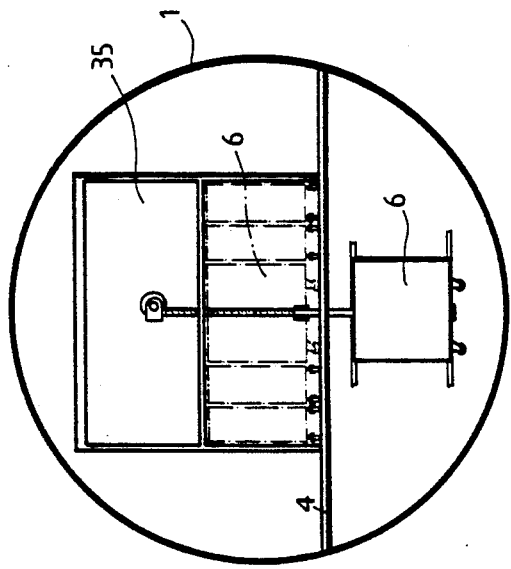
FIG. 9 is a sectional view along section line IX—IX in FIG. 7.

DETAILED DESCRIPTION OF PREFERRED EXAMPLE EMBODIMENTS AND OF THE BEST MODE OF THE INVENTION

The embodiment of a food supply system according to the invention shown in FIGS. 1 to 3, is adapted for large capacity aircraft requiring a substantial number of supply carts to carry the needed quantity of food and drink. The supply system is installed in the aircraft body or fuselage 1 enclosing a passenger deck 2 and a lower deck 3. Both decks are separated by an intermediate floor 4. The portion of the food supply system installed on the passenger deck 2 comprises a two component pantry means in the form of a dresser or buffet 5, the lower portion of which has stalls for twelve food supply carts 6 which are movable in and out of these stalls. The carts are shown by dash-dotted lines. The passenger deck 2 further carries rows of chairs 7 and the fuselage or body is provided with windows 8 as is conventional. Buffet components 5 stand back to back.

According to the invention a further set of twelve supply carts 6 is held on a fixed platform 9 on the lower deck 3. A lifting mechanism 10 is arranged below the platform 9 which is provided with holes through which a lifting and lowering member such as a telescoping piston cylinder device 14 reaches for lifting or lowering a cart in a selective manner between the upper and lower deck. The lifting mechanism 10 comprises a centrally arranged vertically extending carrier pipe 12 driven by an electro-motor 11 through a gear 11'. The lower end of the carrier pipe 12 is supported by a bearing 12'. A platform support plate 12a is secured to the top of the carrier pipe 12. A horizontally telescoping canti-lever arm 13 is secured to the pipe 12 just below the top plate 12a, whereby the arm 13 is rotatable below the fixed platform 9. At its radially outer ends the canti-lever arm 13 carries a telescoping piston cylinder arrangement 14 extending vertically up and down as mentioned above. The arm 13 as well as the piston cylinder arrangement 14 are operable, for example, hydraulically through controls arranged on the passenger deck, preferably in the pantry.

Due to the rotation of the arm 13 and due to its horizontal telescoping, it is possible to bring the piston cylinder 14 selectively under any one of the carts 6 as illustrated in FIG. 2, wherein the full line shows the piston cylinder 14 under the cart 6' while the dashed line shows the piston cylinder under the cart 6". The floor of the platform 9 may be made as a grid structure or it may be provided with the above mentioned holes so that the piston cylinder 14 may conveniently reach through these holes for selectively lifting or lowering any one of these carts 6. A door not shown is provided for this purpose in the floor 4 between the pantry 5 and the lower deck. As shown in FIG. 3, the bearing 12' for the carrier pipe 12 is supported on a bracket 15 mounted in the fuselage 1.

The embodiment illustrated in FIGS. 4 to 6 is intended for aircraft requiring a smaller number of food supply carts 6. A single component buffet 20 is installed on the passenger deck 2 and has seven stalls for seven carts 6 arranged in parallel to one another. Eight supply carts 6 are supported on a turnstile or merry-go-round type platform 21 on the lower deck 3, whereby the longitudinal axis of the carts 6 extends radially relative to a central post 21' of the turnstile 21. The post is rotatably mounted at its top end to the floor 4 and at its lower end on a bracket 22. A motor 23 drives the turnstile 21 through gears 24 for selectively rotating any one of the carts 6 into a position for cooperation with a lifting mechanism 25 mounted in a stationary position on a bracket 25' and having a piston cylinder telescoping device for lifting or lowering a cart as best seen in FIG. 4. Here again, the rotation of the turnstile 21 and the operation of the telescoping piston cylinder device of the lifting mechanism 25 is controlled from a control panel not shown, but conventionally installed on the passenger deck. The floor 4 is provided with a door or other type of opening for the movement of the carts 6 through the floor 4. Inside the buffet 20 the carts may be moved manually from stall to stall.

Figure 7:
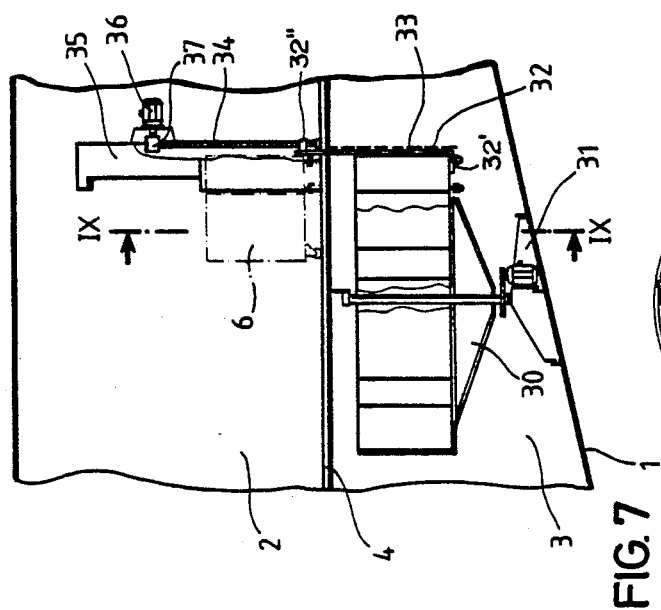
FIG. 7 is a side view similar to that of FIGS. 1 and 4, but showing a further embodiment of the system according to the invention.
Figure 8:
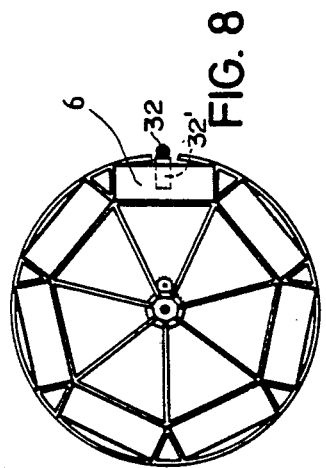
FIG. 8 is a top plan view onto the platform of FIG. 7 showing the carts arranged in a substantially circular, end to end orientation.

The embodiment illustrated in FIGS. 7 to 9 also comprises a turnstile or merry-go-round platform 30 mounted for rotation on a bracket 31 on the lower deck 3 and driven as described above with reference to FIGS. 4 to 6. The turnstile 30 carries seven carts 6 arranged substantially circularly along the periphery of the turnstile in an end to end relationship as shown in FIG. 8. In this embodiment the lifting mechanism comprises a lifting rail 32 provided with a foot 32' that reaches below a cart 6. The lifting rail 32 is guided in a guide rail 33 and the upper end of the lifting rail is provided with a threaded nut 32" cooperating with a threaded spindle 34 driven by an electric motor 36 through a clutch 37 for lifting a cart 6 into the pantry dresser or buffet 35 or for respectively lowering a cart out of the dresser 35 back onto the turnstile 30. When a cart 6 is resting on the foot 32' of the lifting rail 32, the longitudinal axis of that cart is oriented in a direction extending substantially across the longitudinal axis of the fuselage 1. As seen in FIG. 9 the crosswise oriented cart 6 moves into a central space in the dresser 35 and the carts are again manually movable within the dresser into an orientation such that the longitudinal cart axis extends substantially in parallel to the longitudinal fuselage axis. Thus, four additional carts may be held in the dresser 35.

Figure 10:
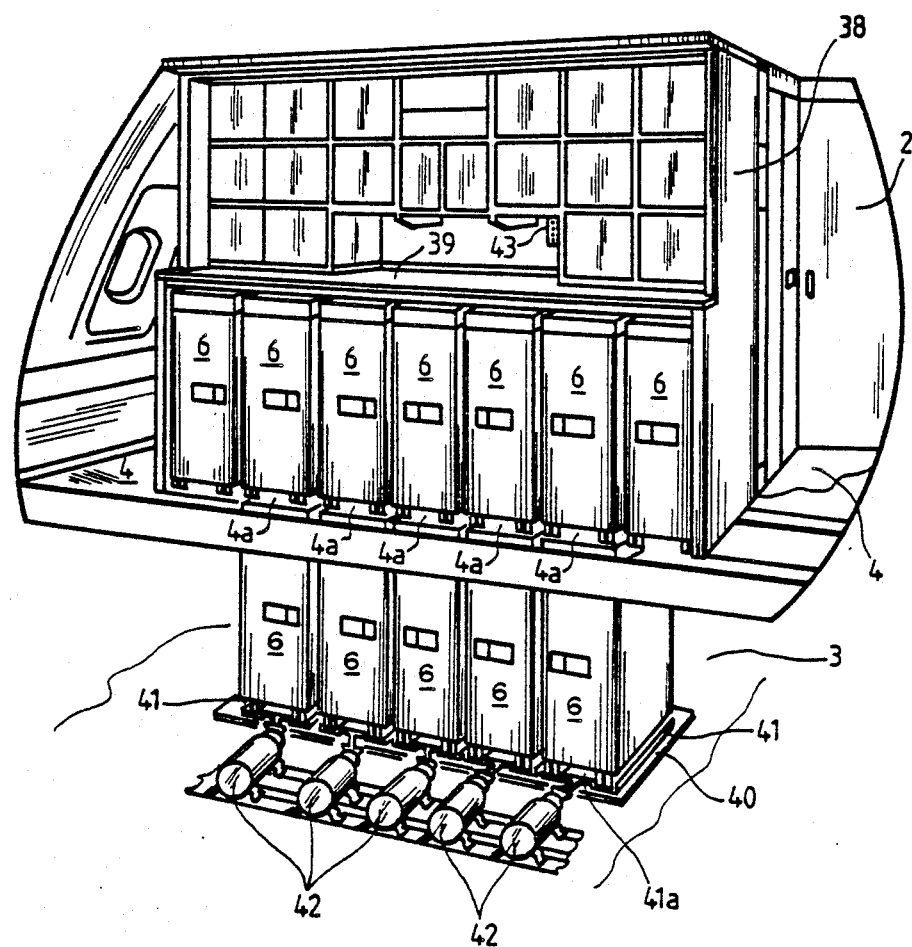
FIG. 10 is a perspective view of a fourth embodiment of the system according to the invention showing food supply carts arranged in a row on a platform on the lower deck.

FIG. 10 illustrates a perspective view of a fourth embodiment of a food supply system according to the invention comprising essentially a pantry buffet 38 installed on the floor 4 of the upper deck 2 and provided with a work space or surface 39 located at a given work level above the upper deck floor to provide a space below the work surface 39 forming a counter top. Seven supply carts 6 are held in respective stalls in the lower portion of the buffet 38. Thus, all carts 6 have a height slightly less than the work level to fit under the counter top 39. A platform 40 is installed on the lower deck 3. The platform 40 carries 5 racks, each cooperating with its own individual lifting mechanism driven by a respective motor 42. The details of such lifting mechanisms are conventional. Each rack 41 carries a support plate 41a supporting a respective cart 6. Thus, the total number of carts on the upper and lower deck is twelve. The floor 4 between the decks is provided with doors 4a, each supporting a respective cart on the upper floor. The doors 4a close a respective hatch or opening in the floor and the doors can only be opened when a cart is not present on top of a door.

A control panel 43 with respective operating or control keys or buttons is conveniently arranged adjacent to or above the work surface 39. Thus, the control panel 43 is easily accessible for enabling the personnel to control the operation of the lifting mechanisms. The control panel is also provided with one or more signal lamps for indicating the operational state as well as the individual situation with regard to each support plate 41a.

The embodiment of FIG. 10 works as follows. Prior to placing a supply cart 6 onto the racks on the platform the respective support plate 41a is lifted by its motor 42 in response to operating a respective key or button on the control panel 43. Provided no cart is located on a door 4a, the respective door will open and the support plate 41a is lifted into its upper position in which it extends horizontally and flush with the top surface of the intermediate floor 4. Thereafter, a cart is manually moved onto the support plate 41a, whereupon a button or key is again operated on the control panel 43 for moving the cart on its support plate 41a down. When the support plate 41a with a cart thereon reaches its lower position on the respective rack 41 on the platform 40, the respective door 4a closes automatically, for example, in response to the operation of a spring or the like. If a cart is to be removed from the support plate 41a, the sequence of operation is the reverse of the just described sequence. The individual control of the motors 42 through the control panel 43 is separately provided for each motor 42. Thus, it is possible to intentionally select any one of the carts on the lower platform 40. However, end position sensors cooperating with the doors 4a and with respective logic circuits provide a safety feature assuring that a cart 6 on the platform 40 cannot be lifted from the lower deck 3 to the upper deck 2 as long as a cart is still located on top of the door 4a. Known logic circuit components and end position sensors in the form of switches are used for this purpose.

Figure 11:
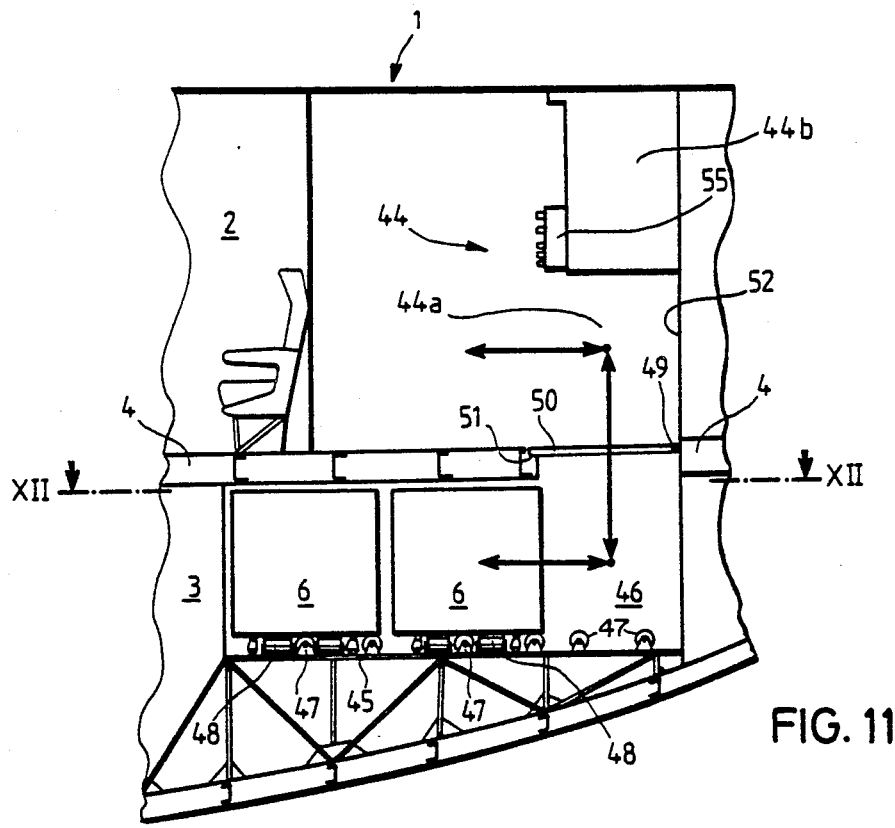
FIG. 11 is a side view of a fifth embodiment of a system according to the invention in which the carts are arranged in two rows on a platform on the lower deck.
Figure 12:
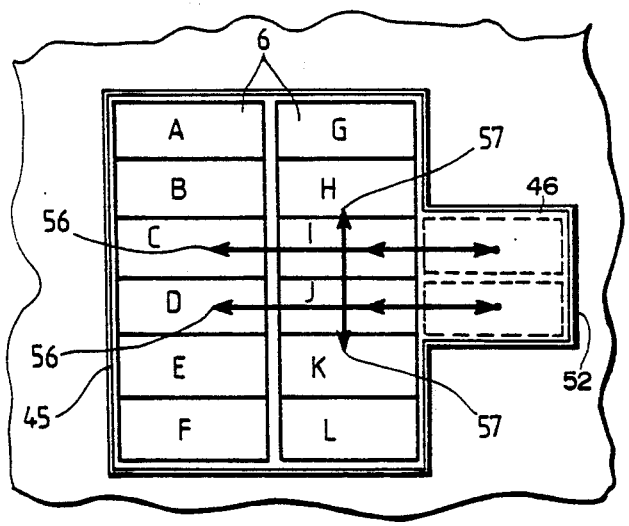
FIG. 12 is a top plan view onto the carts on the platform on the lower deck, whereby the viewing plane is indicated by the line XII—XII in FIG. 11.

FIGS. 11 and 12 illustrate the fifth embodiment of a food supply system according to the invention, whereby FIG. 11 shows a side view partially in section through the fuselage 1 wherein a pantry dresser 44 is installed in the pantry on the upper deck 2. The dresser 44 has a lower component 44a and an upper component 44b. A stationary platform 45 is mounted, for example, on trusses in a fixed position on the lower deck 3. An open shaft 46 extends from the lower dresser component 44a down to the level of the platform 45 on the lower deck 3. A conventional elevator not shown is installed in the shaft 46.

FIG. 12 shows a view in the direction perpendicularly to the plane indicated by the arrows XII—XII in FIG. 11. The platform 45 comprises a total of twelve stalls A to L each holding one supply cart 6. The shaft 46 has a horizontal width in the direction across the longitudinal axis of the aircraft fuselage such that the elevator can hold two carts as shown in dashed lines in FIG. 12. The system is operated electrically and may be in operation during ground servicing of the aircraft, as well as in flight. If desired, two conventional elevators may be arranged in the shaft 46. In any event, the elevator may be driven electrically or hydraulically or mechanically as described with reference to the above mentioned embodiments. If two elevators are installed in the shaft 46, they may be operated independently of each other or in parallel to each other. If one elevator is provided it will normally transport two carts simultaneously.

The platform 45 is equipped with driven rollers 47 for moving the carts 6 in the direction of the arrows 56. The platform 45 is further equipped with driven rollers 48 for moving the carts in the direction of the arrows 57 as shown in FIG. 12. A flap door 50 hinged at 49 to the vertical wall of the shaft 46 normally closes the shaft 46 at the upper level of the floor 4. In the shaft closing lower position of the flap door 50 the latter rests with an edge on a support 51, whereby the upwardly facing surface of the door 50 is flush with the floor. In this position of the door 50 it forms an extension, so to speak, of the floor 4 which reaches into the shaft 46. When the door 50 is opened, it is tilted about the hinge 49 in an upward direction until it rests against the rear wall 52 of the shaft 46. For movement of the carts 6 onto the platform 45 the elevator or elevators are moved into their upper position inside the lower portion or component 44a of the dresser 44. When the elevators are in the up position, the door 50 is resting against the rear wall 52. For practical purposes two carts 6 are moved simultaneously into the elevators or elevators, whereupon operation of a respective key on the control panel 55 causes the lowering of the carts 6. When the elevator top has cleared the floor level the door 50 closes again automatically, for example, in response to a spring not shown, so that the free edge of the door 50 rests on the support 51.

After the first two carts 6 have reached the level of the platform 45, the rollers 47 are operated to bring the carts into the positions C and D, whereupon the rollers 48 are operated to bring the carts, for example in the positions A and B. Thereafter, the positions E and F are filled in the same manner. When the left-hand row is filled, the right-hand row is filled by first moving the carts into the positions I and J and from there into the positions H and G, or K and L, or vice versa. Positions I and J are filled last with the eleventh and twelfth cart. When the platform is filled, the elevator is moved down and the door 50 closed again so that two additional carts may be inserted into the upper shaft portion in the lower dresser component 44a.

Instead of using the rollers 47 and 48 for the transport of the carts 6 on the platform 45, other conventional means may be used for this purpose. For example, transport chains with entraining hooks may be employed. In all of these embodiments the control panel 55 is used for enabling the personnel to cause the automatic loading and unloading in response to operation of the respective control keys or buttons.

In addition to the embodiments shown in the drawing, it is possible to modify the platforms or turnstiles and the invention is not limited to the use of any particular lifting mechanism in any specific embodiment. Rather, any suitable conventional lifting mechanism may be employed in any of the shown and described embodiments.

Although the invention has been described with reference to specific example embodiments, it will be appreciated, that it is intended to cover all modifications and equivalents within the scope of the appended claims.

What is claimed is:

1. A food supply system for an aircraft having an upper deck and a lower deck, comprising pantry means on said upper deck, said pantry means comprising counter top means (39) at a given work level above said upper deck, and on said lower deck a fully automatic storage area without any personnel, a passage opening in said upper deck directly below said counter top means, said passage opening connecting said pantry means on said upper deck with said storage area on said lower deck, cart carrying platform means operatively installed in said automatic storage area on said lower deck substantially vertically below said pantry means, more than two supply carts carried by said platform means in said automatic storage are, said supply carts having a height less than said given work level for individually fitting under said counter top means when any supply cart is lifted into said passage opening, first automatic power drive means and lifting means automatically operable by said power drive means provided for selectively lifting any supply cart from said storage area into a space below said counter top means in said pantry means, or for automatically and individually lowering any one of said supply carts from said space below said counter top means (39) in said pantry means to said lower deck through said opening, second drive means for providing relative rotation between said cart carrying platform means and said lifting means to bring a cart and said lifting means into a cooperating relationship with each other to perform said lifting said lifting or lowering, and control panel means including operating means for said lifting means, located in said pantry means for individually controlling said lifting means and said platform means in said pantry means whereby the presence of a flight attendant in said automatic storage area is obviated and whereby said counter top means protect a flight attendant in said pantry means from accidental injury by said lifting means.

2. The system of claim 1, wherien said cart carrying platform means comprise a rectangular floor with holes therein, wherein said supply carts are arranged in at least one row next to one another on said rectangular floor and wherein said lifting means comprise a horizontally telescoping cantilever arm (13) installed for rotation below said cart carrying platform means said lifting means comprising a vertically telescoping piston cylinder means (14) attached to a free end of said horizontally telescoping cantilever arm (13) for selectively reaching through any one of said holes for lifing or lowering a respective supply cart, said second drive means comprising motor means (11, 11') arranged for rotating said horizontally telescoping catilever arm for bringing said vertically telescoping piston cylinder means (14) under any one of said supply carts.

3. The system of claim 1, wherein said platform means comprise a turnstile, wherein said second drive means comprise motor means connected to said turnstile for stepping said turnstile successively into a position for presenting different supply carts to said lifting means, and wherein said lifting means are stationary in a position for cooperation with said turnstile for said lifting or lowering of a respective supply cart.

4. The system of claim 3, wherein said supply carts are arranged on said turnstile in a radial orientation so that the length of each cart extends radially away from the rotational center of the turnstile.

5. The system of claim 3, wherein said supply carts are arranged along the periphery of said turnstile so that a radially outer longitudinal edge of each cart forms a chord of the circumference of said turnstile.

6. The system of claim 1, wherein said platform means comprises a rectangular floor, wherein said supply carts are arranged in at least one lateral row on said platform means next to each other below said pantry means.

7. The system of claim 1, wherein said platform means comprise a rectangular floor, wherein said supply carts are arranged in a plurality of rows on said platform means next to each other, said system further comprising transport means for moving said supply carts in two directions on said platform means.

8. The system of claim 7, wherein said cart moving directions extend orthogonally to each other.

9. The system of claim 1, wherein said lifting means comprise telescoping piston cylinder members (25) for raising or lowering any one of said supply carts.

10. The system of claim 1, wherein said lifting means comprise a guide rail, a cart lifting and lowering rail movably guided in said guide rail, a threaded nut rigidly secured to said lifting and lowering rail, and threaded spindle means operatively engaging said threaded nut for raising and lowering a cart held by said lifting and lowering rail.

* * * * *